(12) United States Patent
Song

(10) Patent No.: US 9,781,982 B2
(45) Date of Patent: Oct. 10, 2017

(54) INFORMATION PROMPTING BRACELET AND INFORMATION PROMPTING SYSTEM

(71) Applicant: Boe Technology Group Co., Ltd., Beijing (CN)

(72) Inventor: Song Song, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 292 days.

(21) Appl. No.: 14/744,201

(22) Filed: Jun. 19, 2015

(65) Prior Publication Data

US 2016/0206055 A1    Jul. 21, 2016

(30) Foreign Application Priority Data

Jan. 20, 2015    (CN) .......................... 2015 1 0028074

(51) Int. Cl.
  *H04B 3/36*    (2006.01)
  *A44C 5/00*    (2006.01)
  *G06F 1/16*    (2006.01)
  *G06F 3/01*    (2006.01)

(52) U.S. Cl.
  CPC .......... *A44C 5/0015* (2013.01); *A44C 5/0053* (2013.01); *G06F 1/163* (2013.01); *G06F 3/016* (2013.01)

(58) Field of Classification Search
  CPC ..... A44C 5/0015; A44C 5/0053; G06F 1/163; G06F 3/016
  USPC ............................................ 340/407.1, 573.1
  See application file for complete search history.

(56) References Cited

U.S. PATENT DOCUMENTS

2005/0091338 A1*  4/2005  de la Huerga ........ A61J 1/1437
                                                                    709/217

FOREIGN PATENT DOCUMENTS

| CN | 103970208 | 8/2014 |
|---|---|---|
| CN | 104243639 | 12/2014 |
| CN | 204046672 | 12/2014 |

(Continued)

OTHER PUBLICATIONS

Office action from Chinese Application No. 201510028074.0 dated Sep. 30, 2015.

*Primary Examiner* — Daryl Pope
(74) *Attorney, Agent, or Firm* — Calfee, Halter & Griswold LLP

(57) ABSTRACT

The present disclosure relates to an information prompting bracelet and an information prompting system. The information prompting bracelet includes: a flexible substrate, a connecting portion, control portions, pressure levers and an elastic deformation portion. When the control portions receive promoting information, they will control the pressure levers to move towards the side facing the flexible substrate. With the movement of the pressure levers, the elastic deformation portion will be squeezed towards the middle region, so that the distance between the inner surface of the elastic deformation portion at the middle region and the inside of the flexible substrate after squeezing will be larger than the distance between the inner surfaces of the pressure levers and the inside of the flexible substrate when in an initial position. In this way, this will bring the wearer a sense of pressure to notify the wearer that there is a prompting signal needing to be received.

20 Claims, 7 Drawing Sheets

(56) References Cited

FOREIGN PATENT DOCUMENTS

| | | |
|---|---|---|
| CN | 104269123 | 1/2015 |
| WO | 2012/028760 | 3/2012 |

* cited by examiner

INFORMATION PROMPTING BRACELET AND INFORMATION PROMPTING SYSTEM

RELATED APPLICATIONS

The present application claims the benefit of Chinese Patent Application No. 201510028074.0, filed on Jan. 20, 2015, the entire disclosure of which is incorporated herein by reference.

BACKGROUND OF THE DISCLOSURE

1. Field of the Disclosure

The present disclosure relates to the technical field of communication, in particular, to an information prompting bracelet and an information prompting system.

2. Description of the Prior Art

With the trend of intelligentization of terminals, the terminals have more and more functions and become part of human life. However, up to now, most of terminals prompt users by vision, sound or vibration effects. Taking mobile phone as an example, when a call is coming, the users are prompted usually by phone ring or vibration effects. However, in noisy environment, if the user does not bring the mobile phone close to his body, the user might not be prompted in time in the way of vision, sound or vibration effects, thereby missing some important information promptings.

SUMMARY OF THE DISCLOSURE

In light of this, the present disclosure provides an information prompting bracelet and an information prompting system, which can be used to solve the problem that the user might not get the information prompting in time by the way of vision, sound or vibration effects in existing terminals due to environment reasons or the like.

Therefore, the present disclosure provides an information prompting bracelet, comprising:

a flexible substrate in strip form; the flexible substrate has an upper edge region, a lower edge region and a middle region located between the upper edge region and the lower edge region;

a connecting portion, which is used to fixedly connect two ends of the flexible substrate, so that the flexible substrate can be in annular form;

a plurality of control portions, which are respectively fixed on the upper edge region and the lower edge region inside the flexible substrate;

an elastic deformation portion, which are fixed inside the flexible substrate and covers the middle region of the flexible substrate and the upper edge region and lower edge region except the areas occupied by the control portions;

arched pressure levers, which are located inside the elastic deformation portion and are located between adjacent control portions at positions corresponding to the upper edge region and the lower edge region, the arc of each pressure lever bending towards one side of the flexible substrate; wherein:

the control portions are configured to control the pressure levers to move towards the side facing the flexible substrate to preset positions upon receiving prompting information;

the elastic deformation portion can be squeezed towards the middle region by the pressure levers, so that the distance between the inner surface of the elastic deformation portion at the middle region and the inside of the flexible substrate after squeezing will be larger than the distance between the inner surfaces of the pressure levers and the inside of the flexible substrate when in initial position.

According to an aspect of the present disclosure, in the above information prompting bracelet provided in the embodiment of the present disclosure, the control portions are further configured to control the pressure levers to stay at the preset positions for preset time, and then restore to their initial positions or control the pressure levers to stay at the preset positions until the control portions receive a cancel request to restore the pressure levers to their initial positions;

the elastic deformation portion will restore it original shape after the pressure levers restore to their initial positions.

In a possible embodiment, in the above information prompting bracelet provided in the embodiment of the present disclosure, the elastic deformation portion is made up by an inflatable balloon.

In a possible embodiment, in the above information prompting bracelet provided in the embodiment of the present disclosure, the control portion comprises: a control unit and a strut; wherein:

the cross section of the strut is in trapezoidal or triangular form along extension direction of the flexible substrate;

the control unit is configured to receive prompting information and control the movement of the pressure levers at two sides of the strut according to the prompting information.

According to an aspect of the present disclosure, in the above information prompting bracelet provided in the embodiment of the present disclosure, the control portion further comprises a protective sleeve for wrapping the strut, the control unit and a preset length at the top end of each pressure levers at two sides of the strut.

According to an aspect of the present disclosure, in the above information prompting bracelet provided in the embodiment of the present disclosure, the material of the connecting portion is elastic material.

According to an aspect of the present disclosure, in the above information prompting bracelet provided in the embodiment of the present disclosure, the number of the pressure levers disposed on the upper edge region and the lower edge region are the same.

According to an aspect of the present disclosure, in the above information prompting bracelet provided in the embodiment of the present disclosure, there are two pressure levers disposed on the upper edge region and the lower edge region respectively.

According to an aspect of the present disclosure, in the above information prompting bracelet provided in the embodiment of the present disclosure, the control portions in the upper edge region and the lower edge region are distributed symmetrically.

According to an aspect of the present disclosure, in the above information prompting bracelet provided in the embodiment of the present disclosure, it further comprises cross beams, each of which is fixed between two control portions distributed symmetrically and is located on the elastic deformation portion.

According to an aspect of the present disclosure, the present embodiment also provides an information prompting system which comprises the above mentioned information prompting bracelet and a terminal which is configured to send prompting information to the information prompting bracelet.

The above described information prompting bracelet and information prompting system provided in the embodiments of the present disclosure comprise: a flexible substrate, a connecting portion, a control portion, a pressure lever and an elastic deformation portion. When the control portions receive promoting information, they will control the pressure levers to move to the side facing the flexible substrate. With the movement of the pressure levers, the elastic deformation portion will be squeezed towards the middle region, so that the distance between the inner surface of the elastic deformation portion at the middle region and the inside of the flexible substrate after squeezing will be larger than the distance between the inner surfaces of the pressure levers and the inside of the flexible substrate. In this way, this will bring the wearer a sense of pressure to notify the wearer that there is a prompting signal needing to be received.

DETAILED DESCRIPTION OF THE PRESENT DISCLOSURE

The specific embodiments of the present disclosure of the information prompting bracelet and its system will be described in more detail in conjunction with the drawings.

Currently, most of terminals prompt users by vision, sound or vibration effects. Taking mobile phone as an example, when a call is coming, the users are prompted usually by phone ring or vibration effects. However, in noisy environment, if the user does not bring the mobile phone close to his body, the user might not be prompted in time in the way of vision, sound or vibration effects. As to bracelet, as ornament, it is very popular. However, existing bracelet has unitary function of ornamentation.

Figure 1A:
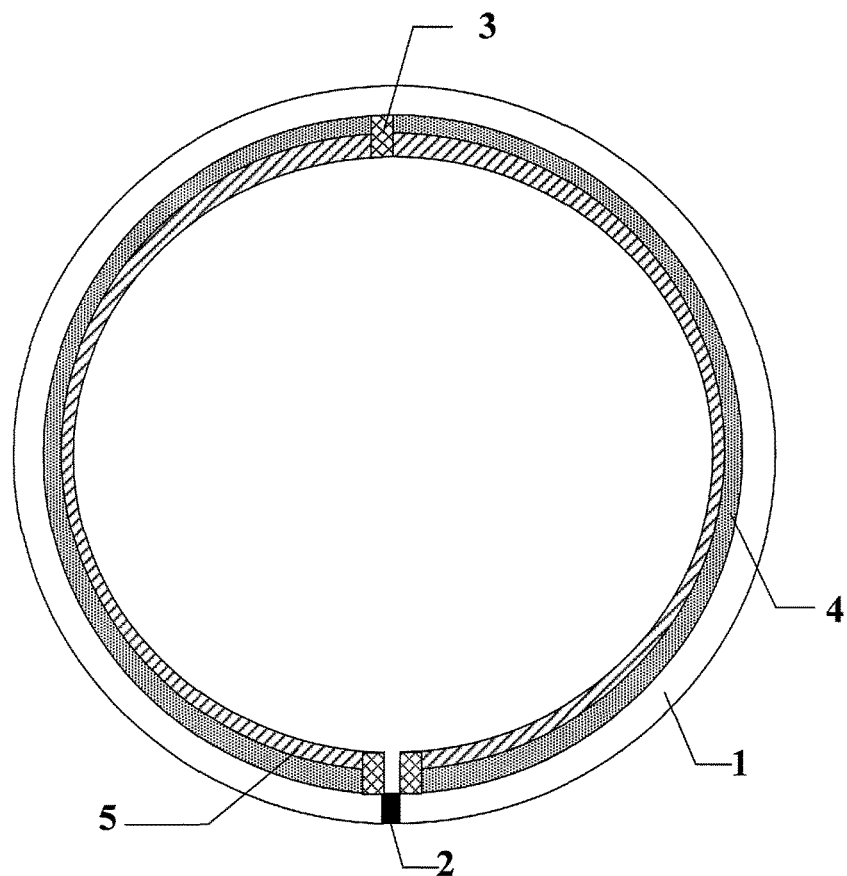
FIG. 1a is a schematic view showing the structure of an information prompting bracelet when there is no prompting information according to an embodiment of the present disclosure.
Figure 1B:
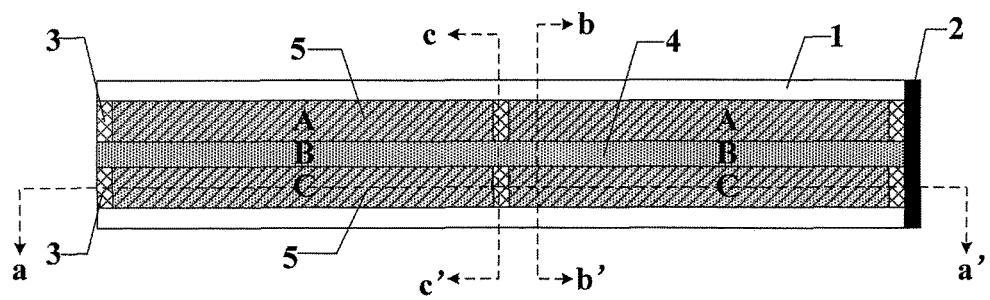
FIG. 1b is a schematic view showing the inside structure of the information prompting bracelet shown in FIG. 1a after breaking apart.
Figure 1C:
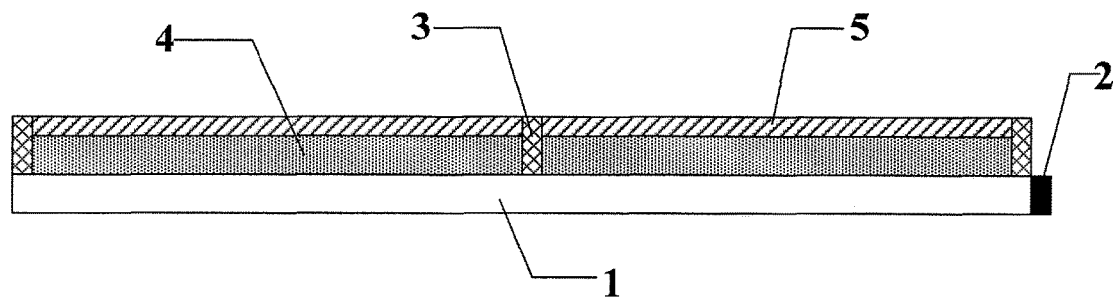
FIG. 1c is a schematic view showing the cross section of the structure of the information prompting bracelet taken along the direction a-a' shown in FIG. 1b.
Figure 1D:
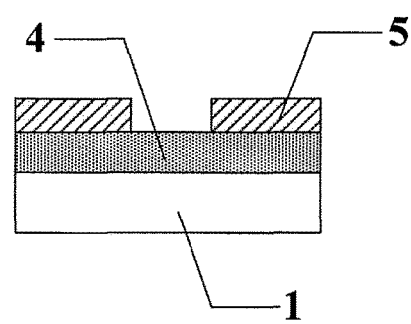
FIG. 1d is a schematic view showing the cross section of the structure of the information prompting bracelet taken along the direction b-b' shown in FIG. 1b.
Figure 1E:
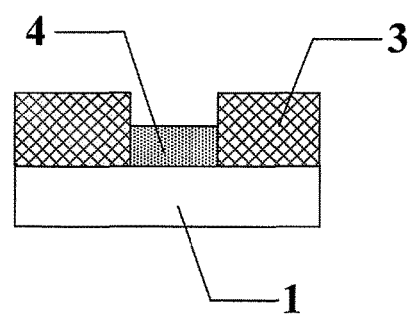
FIG. 1e is a schematic view showing the cross section of the structure of the information prompting bracelet taken along the direction c-c' shown in FIG. 1b.
Figure 2A:
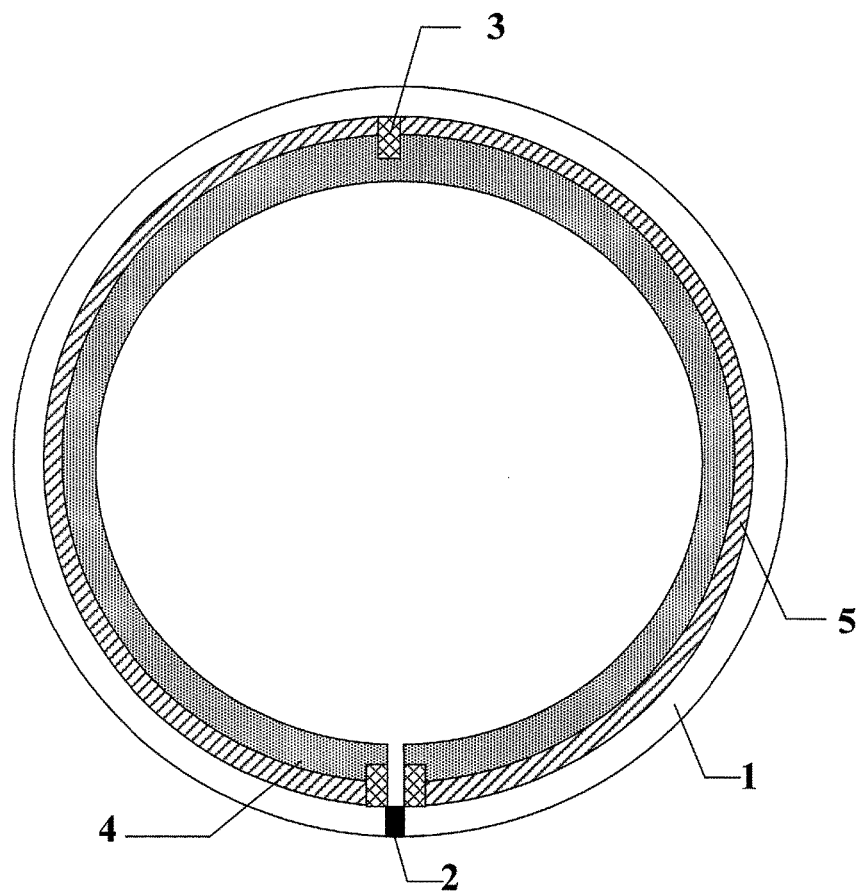
FIG. 2a is a schematic view showing the structure of an information prompting bracelet when there is prompting information according to an embodiment of the present disclosure.
Figure 2B:
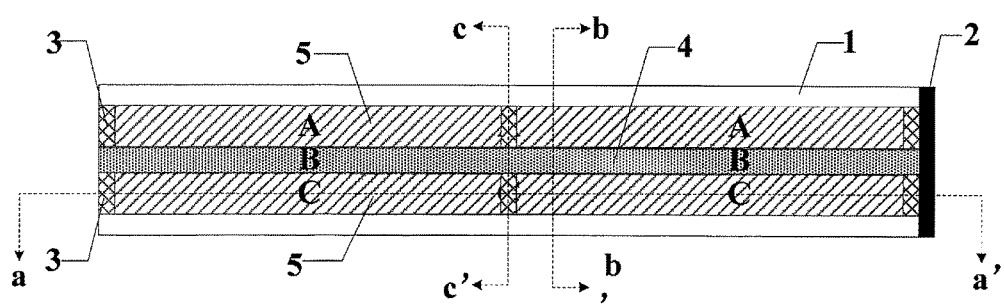
FIG. 2b is a schematic view showing the inside structure of the information prompting bracelet shown in FIG. 2a after breaking apart.
Figure 2C:
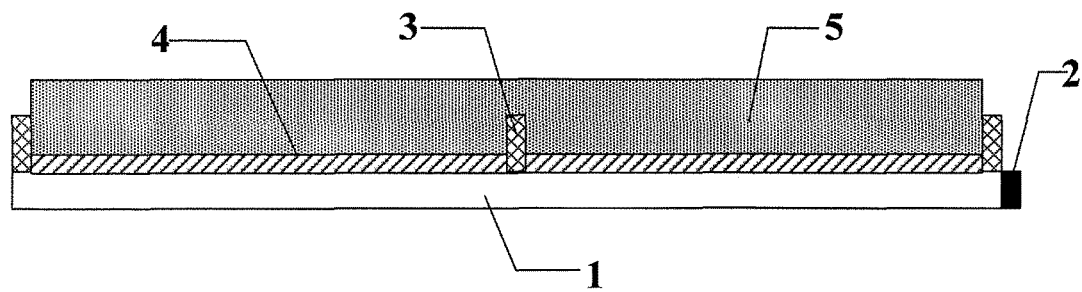
FIG. 2c is a schematic view showing the cross section of the structure of the information prompting bracelet taken along the direction a-a' shown in FIG. 2b.
Figure 2D:
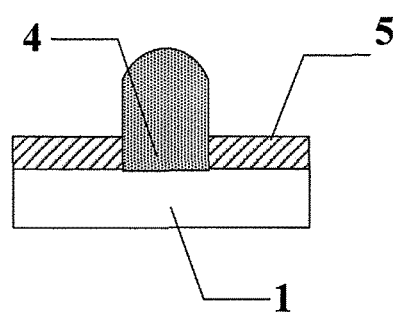
FIG. 2d is a schematic view showing the cross section of the structure of the information prompting bracelet taken along the direction b-b' shown in FIG. 2b.
Figure 2E:
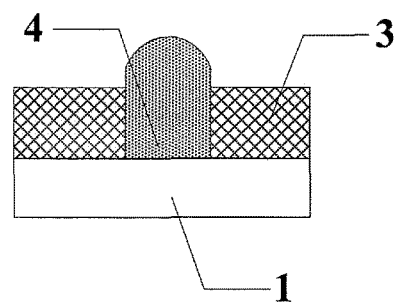
FIG. 2e is a schematic view showing the cross section of the structure of the information prompting bracelet taken along the direction c-c' shown in FIG. 2b.

In light of this, the present disclosure provides an information prompting bracelet as shown in FIG. 1a and FIG. 2e, comprising:

a flexible substrate 1 in strip form; wherein the flexible substrate 1 has an upper edge region A, a lower edge region C and a middle region B located between the upper edge region A and the lower edge region B;

a connecting portion 2, which is used to fixedly connect two ends of the flexible substrate 1, so that the flexible substrate 1 can be in annular form;

a plurality of control portions 3, which are fixed on the upper edge region and the lower edge region inside the flexible substrate 1;

an elastic deformation portion 4, which is fixed inside the flexible substrate 1 and covers the middle region B of the flexible substrate 1 and the upper edge region and lower edge region except the areas occupied by the control portions 3;

arched pressure levers 5, which are located inside of the elastic deformation portion and are located between adjacent control portions at positions corresponding to the upper edge region and the lower edge region, the arc of each pressure lever 5 bending towards one side of the flexible substrate; wherein:

the control portions 3 are configured to control the pressure levers 5 to move towards the side facing the flexible substrate 1 to preset positions upon receiving prompting information;

the elastic deformation portion 4 can be squeezed towards the middle region B by the pressure levers 5 when moving, so that the distance between the inner surface of the elastic deformation portion 4 at the middle region B and the inside of the flexible substrate 1 after squeezing will be larger than the distance between the inner surfaces of the pressure levers 5 and the inside of the flexible substrate 1.

The information prompting bracelet provided by the above embodiment of the present disclosure comprises: a flexible substrate, a connecting portion, control portions, pressure levers and an elastic deformation portion. When the control portions receive promoting information, they will control the pressure levers to move to the side facing the flexible substrate. With the movement of the pressure levers, the elastic deformation portion will be squeezed towards the middle region, so that the distance between the inner surface of the elastic deformation portion at the middle region and the inside of the flexible substrate after squeezing will be larger than the distance between the inner surfaces of the pressure levers and the inside of the flexible substrate. In this way, this will bring the wearer a sense of pressure to notify the wearer that there is a prompting signal need to be received.

According to an aspect of the present disclosure, in order to ensure that the information prompting bracelet has the prompting function continually, in the information prompting bracelet provided by the embodiment of the present disclosure, the control portions 3 are also configured to control the pressure levers 5 to stay at the preset positions for preset time and then restore to initial positions or control the pressure levers 5 to stay at the preset positions until the control portions 3 receive a cancel request to restore the pressure lever 5 to their initial positions;

the elastic deformation portion 4 will restore it original shape after the pressure levers 5 restore to their initial positions.

According to an aspect of the present disclosure, in the information prompting bracelet provided by the embodiment of the present disclosure, the elastic deformation portion is made up by an inflatable balloon. In this way, while the control portions control the pressure levers to move towards the side facing towards the flexible substrate when they receive prompting information, the gas in the upper edge region and the lower edge region in the balloon will be squeezed towards the middle region gradually, so that the volume of the middle region can be increased gradually. Finally, after squeezing, the distance between the inner surface in the middle region of the balloon and the inside of the flexible substrate is larger than the distance between the inner surfaces of the pressure levers and the inside of the flexible substrate in the initial position, so that the wearer will be prompted that there is a prompting information to be read through a sense of pressure on the arm of the wearer by the middle region of the balloon. After preset time or when the control portions receive a cancel request, the control portions will control the pressure levers restore to their initial positions, so that the gas amount squeezed into the middle region then returns to the upper edge region and the lower edge region, and the inflatable balloon restore it original shape ready for the prompting function at the time when the control portions receive prompting information lately.

Figure 3A:
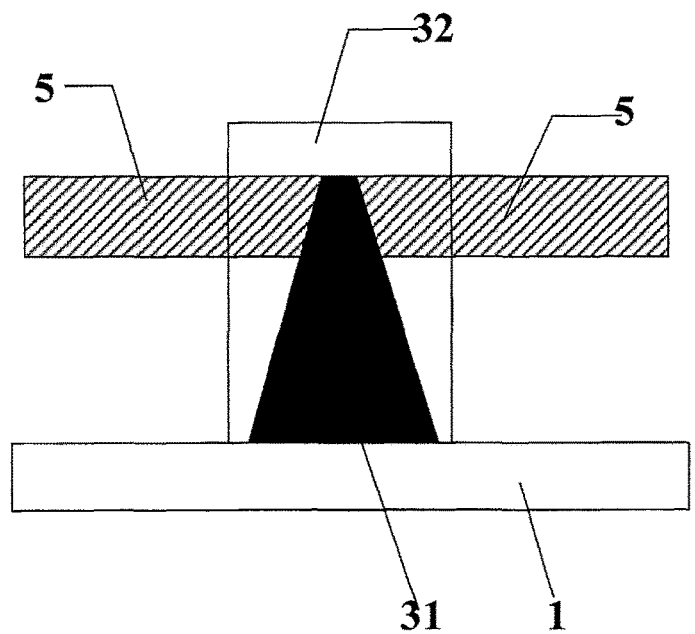
FIG. 3a and FIG. 3b are schematic views showing partial structure of a control portion of the information prompting bracelet according to an embodiment of the present disclosure respectively.
Figure 3B:
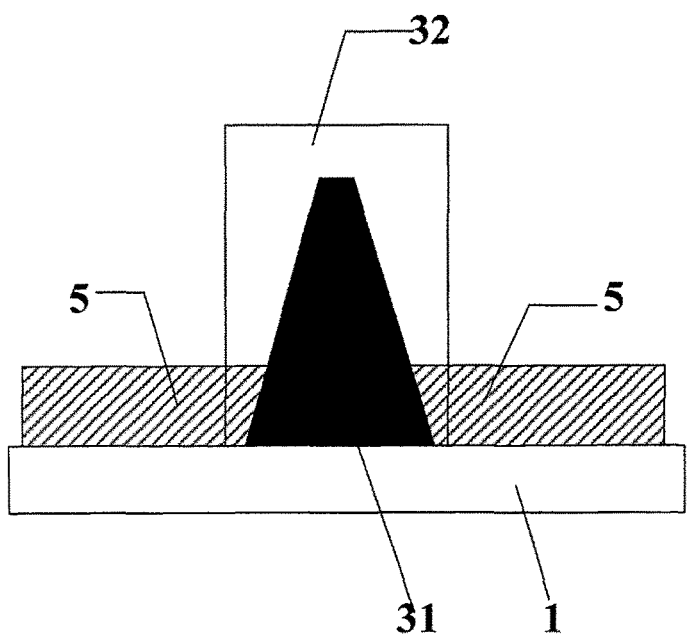
Figure 4A:
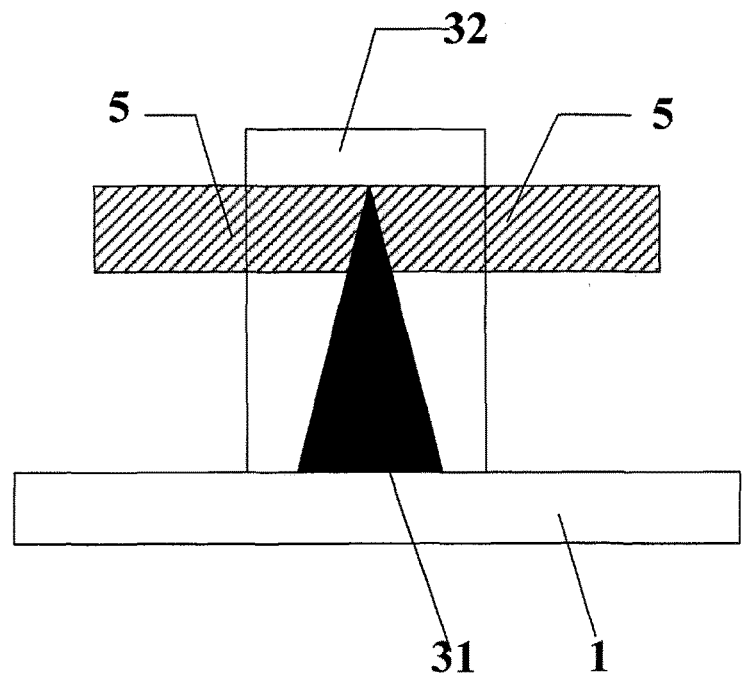
FIG. 4a and FIG. 4b are schematic views showing partial structure of the control portion of the information prompting bracelet according to an embodiment of the present disclosure.
Figure 4B:
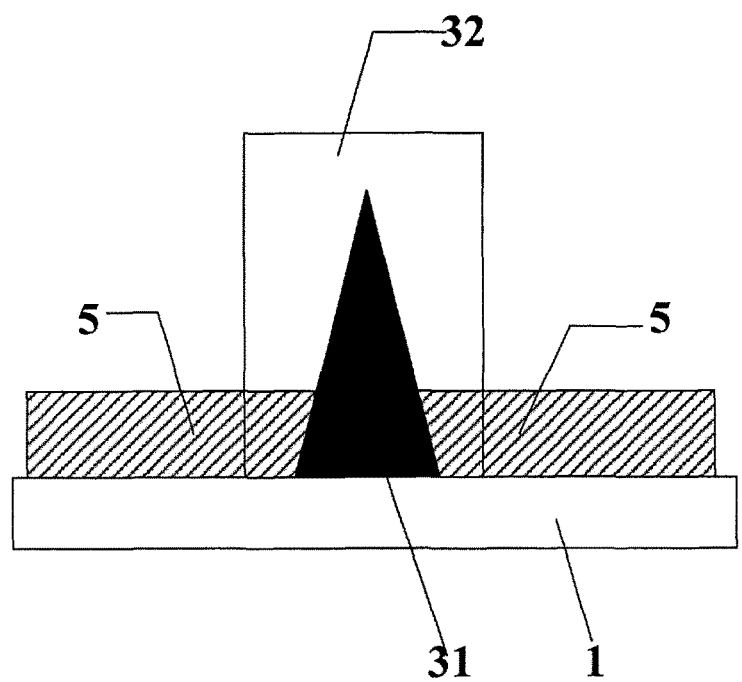

Specifically, in the information prompting bracelet provided by the embodiment of the present disclosure, as shown in FIG. 3a and FIG. 3b, the control portion 3 can comprise a control unit (not shown) and a strut 31; wherein:

as shown in FIG. 3a and FIG. 3b, the cross section of the strut 31 along the extension direction of the flexible substrate 1 is trapezoidal, or alternatively, as shown in FIG. 4a and FIG. 4b, the cross section of the strut 31 along the extension direction of the flexible substrate 1 is triangular;

The control unit is configured to receive prompting information, and control the movement of the pressure levers 5 located at two sides of the strut 31. In this way, during the process that the control unit controls the pressure levers 5 to move to the preset positions, the pressure levers 5 will get closer to the flexible substrate 1 gradually. And the width of the strut along the extension direction of the strut 31 will also get wider as it approaches the flexible substrate 1 so that as the pressure levers 5 get closer and closer to flexible substrate 1, the perimeter of the ring where the pressure lever 5 is located is also get bigger and bigger.

According to an aspect of the present disclosure, in the information prompting bracelet provided by the embodiment of the present disclosure, as shown in FIG. 3a and FIG. 4b, the control portion 3 also comprises: a protective sleeve 32 for wrapping the strut 31, the control unit and a preset length at the top end of each pressure levers 5 at two sides of the strut 32.

According to an aspect of the present disclosure, in order to reduce the degree of discomfort caused by the sense of pressure to the wearer when the information prompting bracelet receives prompting information, in the information prompting bracelet provided by the embodiment of the present disclosure, the material of the connecting portion is elastic material.

Specifically, in implementation, in the information prompting bracelet provided by the embodiment of the present disclosure, the number of the pressure levers disposed in the upper edge region and the number of the pressure levers disposed in the lower edge region can be equal, or unequal, which will not be limited herein.

Figure 5:
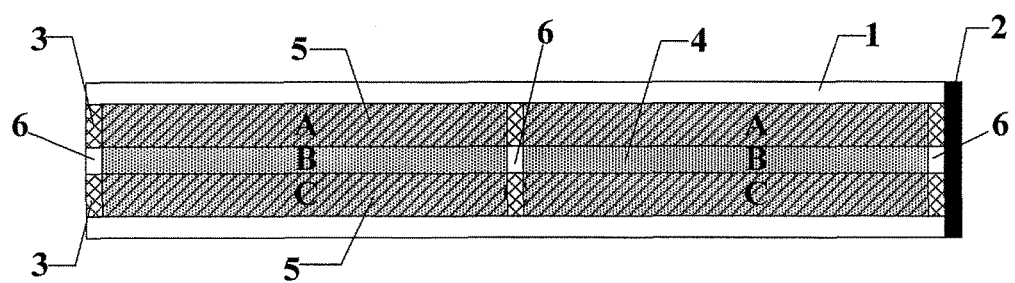
FIG. 5 is schematic view showing the structure of the information prompting bracelet according to an embodiment of the present disclosure.

According to an aspect of the present disclosure, for the convenience of manufacture and the balance of pressure caused by the pressure levers to the elastic deformation portion within the upper edge region and the lower edge region, in the information prompting bracelet provided by the embodiment of the present disclosure, as shown in FIG. 5, the number of the pressure levers disposed in the upper edge region and the lower edge region can be equal.

Furthermore, in the information prompting bracelet provided by the embodiment of the present disclosure, the larger the number of the pressure levers disposed in each edge region, the more uniform the pressure imposed on the elastic deformation portion when the pressure levers squeeze the elastic deformation portion. However, the increase of the number of the control portions will cause the increase of the cost and manufacture difficulty of the information prompting bracelet accordingly. Therefore, in implementation, the number of the pressure levers can be determined according to actual situation, which will not be limited herein.

According to an aspect of the present disclosure, in the information prompting bracelet provided by the embodiment of the present disclosure, two pressure levers are disposed in the upper edge region and the lower edge portion, respectively.

Furthermore, in implementation, for aesthetics and convenience of manufacture, in the information prompting bracelet provided by the embodiment of the present disclosure, as shown in FIG. 5, the control portions in the upper edge region and the lower edge region are distributed symmetrically.

According to an aspect of the present disclosure, in the information prompting bracelet provided by the embodiment of the present disclosure, when the control portions in the upper edge region and the lower edge region are distributed symmetrically, as shown in FIG. 5, it further comprises cross beams 6, each of which is fixed between two control portions 3 distributed symmetrically and is located on the elastic deformation portion 4. In this way, the middle region of the elastic deformation portion can be separated into a plurality of areas by the cross beams, so that when the elastic deformation portion are squeezed by the pressure levers, the elastic deformation portion in the upper region and the lower region are uniformly squeezed into each area of the middle region separated by the cross beams.

Furthermore, in the information prompting bracelet provided by the embodiment of the present disclosure, the cross beam fixed between the two control portions distributed symmetrically can be provided as an integral structure with the protective sleeve in the two control portions, which will not be limited herein.

Based on the same inventive concept, an embodiment of the present disclosure also provides an information prompting system, which comprises an information prompting bracelet and a terminal which is configured to send prompting information to the information prompting bracelet. Because the principles of the information prompting system is similar to that of the above mentioned information prompting bracelet, therefore, the embodiment of the information prompting system can refer to the embodiment of the information prompting bracelet, the repeating part will not be described again herein.

Furthermore, in implementation, the terminal can send prompting information to the information prompting bracelet by wireless, Bluetooth or infrared communication methods, which will not be limited herein. The term "inside" used in the present disclosure refers to the side near the waist, while "outside" refers to the side away from the waist.

The information prompting bracelet comprises: a flexible substrate, a connecting portion, a control portion, a pressure lever and an elastic deformation portion. When the control portions receive promoting information, they will control the pressure levers to move to the side facing the flexible substrate. With the movement of the pressure levers, the elastic deformation portion will be squeezed towards the middle region, so that the distance between the inner surface of the elastic deformation portion at the middle region and the inside of the flexible substrate after squeezing will be larger than the distance between the inner surfaces of the pressure levers and the inside of the flexible substrate when in initial position. In this way, this will bring the wearer a sense of pressure to notify the wearer that there is a prompting signal need to be received.

Obviously, those skilled in the art can make various variations and modifications to the present disclosure without departing from the spirit and the scope of the present disclosure. In this way, if those modifications and variations are within the scope of the claims of the present disclosure or its equivalents, they are intended to be contained in the present disclosure.

The invention claimed is:

1. An information prompting bracelet comprising:
a flexible substrate having a strip configuration and an annular configuration, and an outside and an inside, the inside further comprising an upper edge region, a lower edge region, and a middle region located between the upper edge region and the lower edge region;
a connecting portion that fixedly connects two ends of the flexible substrate to configure the flexible substrate is in an annular form;
a plurality of control portions disposed on the inside of the flexible substrate in the upper edge region and the lower edge region;
an elastic deformation portion disposed on the inside of the flexible substrate covering the middle region, the upper edge region, and the lower edge region except where there are control portions;
a plurality of arched pressure levers disposed inside the elastic deformation portion such that each arched pressure lever is disposed between adjacent control portions in at least the upper edge region and the lower edge region, each pressure lever being arched outwardly toward the flexible substrate;
wherein the control portions are configured to control the pressure levers to move outwardly from an initial position toward the flexible substrate to a predetermined position upon receiving prompting information; and
wherein the elastic deformation portion is capable of being squeezed toward the middle region by the pressure levers so that a distance between an inner surface of the elastic deformation portion in the middle region and an inner surface of the flexible substrate is increased relative to an initial distance between the inner surface of the elastic deformation.

2. The information prompting bracelet according to claim 1, wherein the control portions are configured to control the pressure levers to stay at the predetermined position for a predetermined time;
wherein the control portions are configured to control the pressure levers to return to the initial position after the predetermined time has passed;
wherein the control portions are configured to control the pressure levers to return to the initial position after receiving a cancel request; and
wherein the elastic deformation portion returns to an initial shape after the pressure levers return to the initial position.

3. The information prompting bracelet according to claim 1, wherein the elastic deformation portion is an inflatable balloon.

4. The information prompting bracelet according to claim 1, wherein the control portion comprises:
a control unit; and
a strut having a first side and a second side;
wherein the strut has a cross-sectional shape selected from the group consisting of a trapezoidal cross-sectional shape and a triangular cross-sectional shape;
wherein pressure levers are disposed at the first side and the second side of the strut; and
wherein the control unit receives prompting information and controls the pressure levers to move according to the prompting information.

5. The information prompting bracelet according to claim 4, wherein the strut, the control portion, and at least a portion of an end of each pressure lever are wrapped with a protecting sleeve.

6. The information prompting bracelet according to claim 1, wherein the connecting portion comprises an elastic material.

7. The information prompting bracelet according to claim 1, wherein the same number of pressure levers are disposed on the upper edge region and the lower edge region.

8. The information prompting bracelet according to claim 7, wherein there are two pressure levers disposed on each of the upper edge region and the lower edge region.

9. The information prompting bracelet according to claim 7, wherein the control portions in the upper edge region and the lower edge region are distributed symmetrically.

10. The information prompting bracelet according to claim 9, further comprising cross beams, wherein each cross beam is fixed between two control portions distributed symmetrically and is disposed on the elastic deformation portion.

11. An information prompting system comprising:
an information prompting bracelet; and
a terminal configured to send prompting information to the information prompting bracelet;
wherein the information prompting bracelet comprises:
a flexible substrate having a strip configuration and an annular configuration, and an outside and an inside, the inside further comprising an upper edge region, a lower edge region, and a middle region located between the upper edge region and the lower edge region;
a connecting portion that fixedly connects two ends of the flexible substrate to configure the flexible substrate is in an annular form;
a plurality of control portions disposed on the inside of the flexible substrate in the upper edge region and the lower edge region;
an elastic deformation portion disposed on the inside of the flexible substrate covering the middle region, the upper edge region, and the lower edge region except where there are control portions;

a plurality of arched pressure levers disposed inside the elastic deformation portion such that each arched pressure lever is disposed between adjacent control portions in at least the upper edge region and the lower edge region, each pressure lever being arched outwardly toward the flexible substrate;

wherein the control portions are configured to control the pressure levers to move outwardly from an initial position toward the flexible substrate to a predetermined position upon receiving prompting information; and wherein the elastic deformation portion is capable of being squeezed toward the middle region by the pressure levers so that a distance between an inner surface of the elastic deformation portion in the middle region and an inner surface of the flexible substrate is increased relative to an initial distance between the inner surface of the elastic deformation.

12. The information prompting system according to claim 11, wherein the control portions are configured to control the pressure levers to stay at the predetermined position for a predetermined time;

wherein the control portions are configured to control the pressure levers to return to the initial position after the predetermined time has passed;

wherein the control portions are configured to control the pressure levers to return to the initial position after receiving a cancel request; and wherein the elastic deformation portion returns to an initial shape after the pressure levers return to the initial position.

13. The information prompting system according to claim 11, wherein the elastic deformation portion is an inflatable balloon.

14. The information prompting system according to claim 11, wherein the control portion comprises:

a control unit; and a strut having a first side and a second side;

wherein the strut has a cross-sectional shape selected from the group consisting of a trapezoidal cross-sectional shape and a triangular cross-sectional shape;

wherein pressure levers are disposed at the first side and the second side of the strut; and wherein the control unit receives prompting information and controls the pressure levers to move according to the prompting information.

15. The information prompting system according to claim 14, wherein the strut, the control portion, and at least a portion of an end of each pressure lever are wrapped with a protecting sleeve.

16. The information prompting system according to claim 11, wherein the connecting portion comprises an elastic material.

17. The information prompting system according to claim 11, wherein the same number of pressure levers are disposed on the upper edge region and the lower edge region.

18. The information prompting system according to claim 17, wherein there are two pressure levers disposed on each of the upper edge region and the lower edge region.

19. The information prompting system according to claim 17, wherein the control portions in the upper edge region and the lower edge region are distributed symmetrically.

20. The information prompting system according to claim 19, further comprising cross beams, wherein each cross beam is fixed between two control portions distributed symmetrically and is disposed on the elastic deformation portion.

* * * * *